US011829838B1

(12) United States Patent
LaRussa

(10) Patent No.: US 11,829,838 B1
(45) Date of Patent: Nov. 28, 2023

(54) DIGITAL PRAYER AID

(71) Applicant: Luqman L. LaRussa, Lake Charles, LA (US)

(72) Inventor: Luqman L. LaRussa, Lake Charles, LA (US)

( * ) Notice: Subject to any disclaimer, the term of this patent is extended or adjusted under 35 U.S.C. 154(b) by 139 days.

(21) Appl. No.: 17/572,719

(22) Filed: Jan. 11, 2022

(51) Int. Cl.
*G06M 1/27* (2006.01)
*G08B 7/00* (2006.01)
*G06F 3/147* (2006.01)

(52) U.S. Cl.
CPC ................. *G06M 1/27* (2013.01); *G08B 7/00* (2013.01); *G06F 3/147* (2013.01)

(58) Field of Classification Search
None
See application file for complete search history.

(56) References Cited

U.S. PATENT DOCUMENTS 2,759,096 A 8/1956 Caissie
3,806,911 A 4/1974 Pripusich
4,365,246 A 12/1982 Dewolf et al.
5,505,622 A 4/1996 Bosmani
6,540,519 B2 4/2003 Wexler
6,589,056 B2 7/2003 McGovern
7,204,694 B2 4/2007 Delvecchio et al.
2022/0211148 A1* 7/2022 Jose ....................... G09G 3/035

FOREIGN PATENT DOCUMENTS

CN 213303082 U * 5/2021
KR 2011032387 A * 3/2011
KR 2013095098 A * 8/2013

* cited by examiner

*Primary Examiner* — Kristy A Haupt
(74) *Attorney, Agent, or Firm* — CRAMER PATENT & DESIGN, PLLC; Aaron R. Cramer

(57) ABSTRACT

A digital prayer aid is a handheld rosary bead counting tool having a loop of beads partially secured in a hand grip. The hand grip is configured to digitally count the advancement of a single bead. A digital display provides a user with a number of advanced beads. The hand grip and beads come in a plurality of configurations and colors. The hand grip may be Bluetooth® enabled to receive downloaded prayers and/or scriptural verses.

20 Claims, 8 Drawing Sheets

DIGITAL PRAYER AID

RELATED APPLICATIONS

None.

FIELD OF THE INVENTION

The presently disclosed subject matter is directed to a prayer aid and more specifically to a digital prayer aid.

BACKGROUND OF THE INVENTION

People of deep, whole-hearted religious faith live and are inspired in their daily lives by their beliefs. Many such people engage in prayers in which various words, phrases, invocations, and sayings are repeated in a cyclical fashion. Counting and tracking aids such as rosaries, tasbihs, and the like are utilized to keep track of such prayers to ensure that a proper number of repetitions are recited. Typically, such devices are comprised of multiple beads which are advanced in one's hand between the fingers and thumbs.

While certainly functional, such devices are unable to keep track of prayer counts should they need to be set down. Also, they are designed for only one type of prayer and cannot be reconfigured if different prayers or prayer sequences need to be said. Finally, as with many items in our daily lives, there is a tendency to make such devices electronic or digital so that they may perform additional functions or interface with other electronic devices. Accordingly, there exists a need for a means by which a prayer tracking device can be enhanced to address the deficiencies as described above. The development of the digital prayer aid fulfills this need.

SUMMARY OF THE INVENTION

The principles of the present invention provide for a digital prayer aid that has a series of beads interconnected with a string, a full bead enclosure housing the series of beads and the string, an electronics enclosure having a side mount screen, an LCD-style screen, a side mount speaker, an SD card reader, and a Bluetooth® transmitter to allow for visual text based and audible playback of a plurality of prayers, a light enclosure having a flashlight disposed on the light enclosure that is controlled by a light switch, a display enclosure housing a main screen, a liquid crystal display screen, a plurality of multiple mode control switches, and a reset switch, a beeper and a vibratory mechanism activated when a plurality of predetermined increments of beads movements are activated by a plurality of mode control switches, a charging port disposed on a side of the electronics enclosure and a circle bead enclosure having a plurality of angular guides that allow for visual observation of the series of beads and the string.

The series of beads may include twenty-three beads or thirty-three beads. The series of beads may be made of a material selected from the group consisting of wood, glass, plastic, polymer, metal, or stone. The string may be made of a material selected from the group consisting of silk, nylon, monofilament, leather cord, or waxed linen cord. A tassel may be disposed on the full bead enclosure. The flashlight, the light switch, the side mount screen, the side mount speaker, the SD card reader, the Bluetooth® transmitter and the digital audio player may be powered by a rechargeable battery. The flashlight may be a light-emitting diode. The main screen may include a digital clock having a time zone adjustment, a day and date function, an illuminated screen, a stopwatch, an alarm functions, or an odometer. The main screen may be water resistance. The prayers may be added via an SD card loaded on a computer or via the Bluetooth® transmitter via pairing with a smart phone or tablet computer. The electronics enclosure, the light enclosure, and the display enclosure may be made of plastic. The predetermined increments may include a number of events or bead movements selected from the group consisting of twenty events or bead movements, thirty-three events or bead movements, fifty-two events or bead movements, sixty-six events or bead movements, one hundred events or bead movements or one thousand events or bead movements. The main screen, the mode control switches, the reset switch, the beeper, and the vibratory mechanism may be powered by a battery. The battery may be a coin-cell battery.

The circle bead enclosure may be three-quarters of a circle bead. The circle bead enclosure may be one half of a circle bead. A bead contact switch may include a signal to a main controller whenever a bead passes by it. The main controller may be a single board computer that may include a basic stamp module or Arduino. The digital prayer aid may be adapted to rest upon an index finger, encompassing a plurality of fingers while a thumb is used to pull one of the series of beads for each phrase or incantation from one of the prayers.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
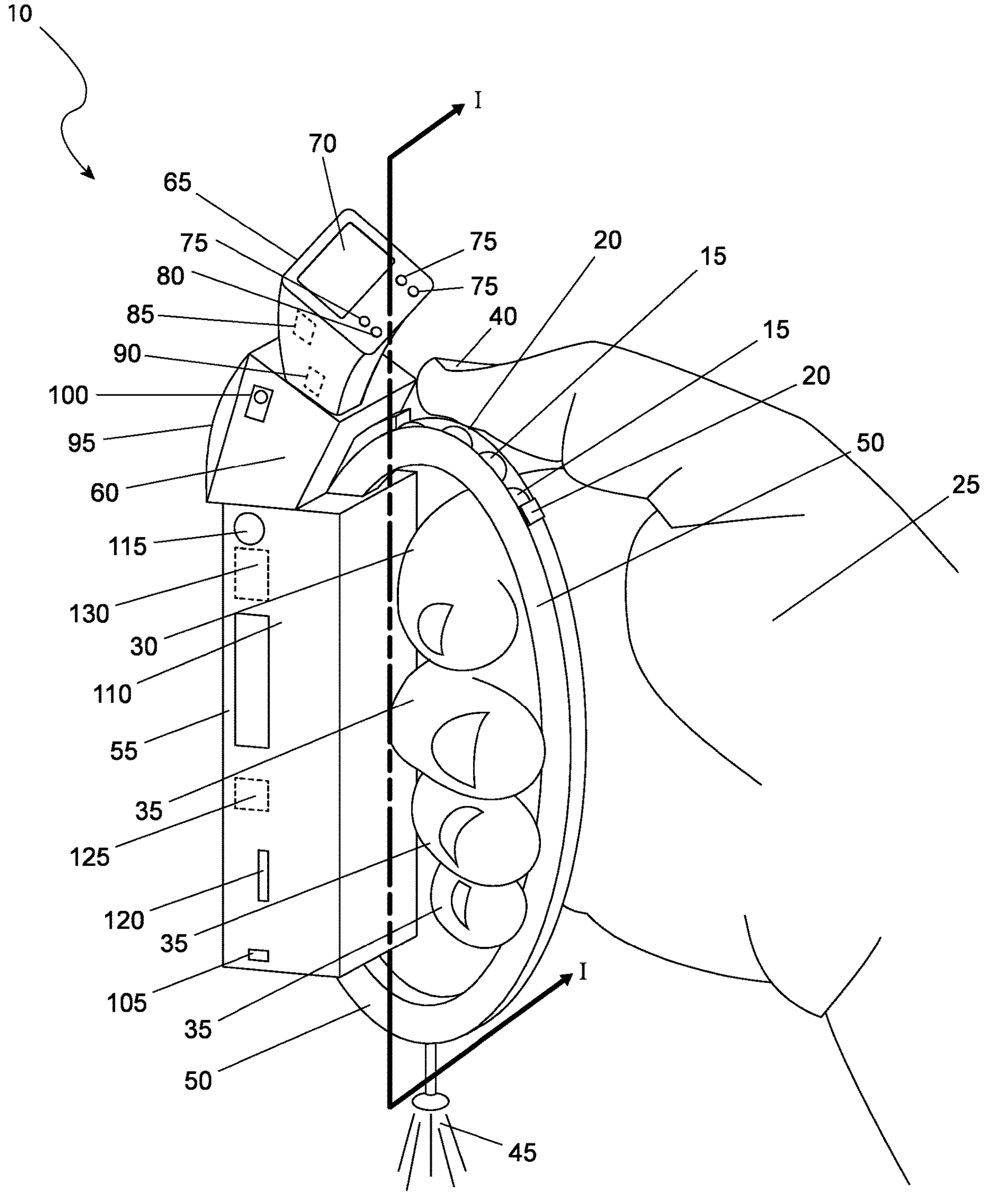
FIG. 1 is a perspective view of the digital prayer aid with counting feature, shown in a utilized state, according to the preferred embodiment of the present invention.

10 digital prayer aid with counting feature
15 bead
20 string

25 right hand
30 index finger
35 finger
40 thumb
45 tassel
50 full bead enclosure
55 electronics enclosure
60 light enclosure
65 display enclosure
70 main screen
75 mode control switch
80 reset switch
85 beeper
90 vibratory mechanism
95 flashlight
100 light switch
105 charging port
110 side mount screen
115 side mount speaker
120 SD card reader
125 Bluetooth transmitter
130 digital audio player
135 three-quarter (¾) circle bead enclosure
140 angular guide
145 one-half (½) circle bead enclosure
150 small battery
155 large rechargeable battery
160 bead contact switch
165 main controller
166 directional stop
167 spring
170 charge controller
175 auxiliary controller

DESCRIPTION OF THE PREFERRED EMBODIMENTS

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the digital prayer aid with counting feature 10, according to the preferred embodiment of the present invention is disclosed. The digital prayer aid with counting feature (herein also described as the "prayer aid") 10, provides for a hand-held, bead-based counting aid used in prayer. In its preferred embodiment, a series of beads 15 are interconnected with string 20. The quantity of beads is envisioned to be twenty-three (23) or thirty-three (33), however, other quantities of beads 15 may be utilized with the present invention. As such, the exact quantity of beads 15 used with the present invention is not intended to be a limiting factor of the present invention. The beads 15 would be made of wood, glass, plastic, polymer, metal, or stone. The string 20 would be made of silk, nylon, monofilament, leather cord, waxed linen cord, or the like.

The invention is designed for use in the right hand 25, however usage in the left hand is possible as well. During use, the prayer aid 10 rests upon the index finger 30, encompassing all fingers 35 while the thumb 40 is used to pull a single bead 15 for each phrase or incantation from prayer, until the suitable quantity is reached. The invention is provided with a full bead enclosure 50 that houses the beads 15 and the string 20, an electronics enclosure 55, a light enclosure 60, and a display enclosure 65. It is envisioned that all enclosures would be made of aesthetically pleasing plastic, available in multiple colors including clear. A tassel may be provided at the lower point of the full bead enclosure 50. The display enclosure 65 houses a main screen 70, preferably a liquid crystal display (LCD) screen, multiple mode control switches 75, and a reset switch 80. A beeper 85 and a vibratory mechanism 90 (both internal to the display enclosure 65 and thus displayed via hidden lines) are activated when certain increments of beads 15 movement is achieved. Such increments, pre-programmed, but adjustable via the mode control switches 75 are envisioned to be every twenty (20), thirty-three (33), fifty-two (52), sixty-six (66), one hundred (100) or one thousand (1000). A flashlight 95, preferably a light-emitting diode (LED) is provided in the light enclosure 60 and controlled by a light switch 100.

The main screen 70 is capable as functioning as a digital clock and will include the following functionality: time zone adjustment, day and date function, illuminated screen, stopwatch, alarm functions, an odometer, water resistance, and the like. A charging port 105 is located on the side of the electronics enclosure 55. The electronics enclosure 55 is provided with a side mount screen 110, also preferably an LCD-style screen, a side mount speaker 115, an SD card reader 120 and a Bluetooth® transmitter 125 (internal to the electronics enclosure 55 and thus depicted via dashed lines) to allow for visual text based and audible playback of different prayers, dependent on time of day or daily activity being performed. The information can be added via an SD card loaded on a computer or directly via the Bluetooth transmitter 125 via pairing with a smart phone or tablet computer, both of which are well-known in the art. The information is envisioned to be made available in multiple languages. The playback would rely on a digital audio player 130 (located internal to the electronics enclosure 55 and thus depicted via dashed lines).

Figure 2:
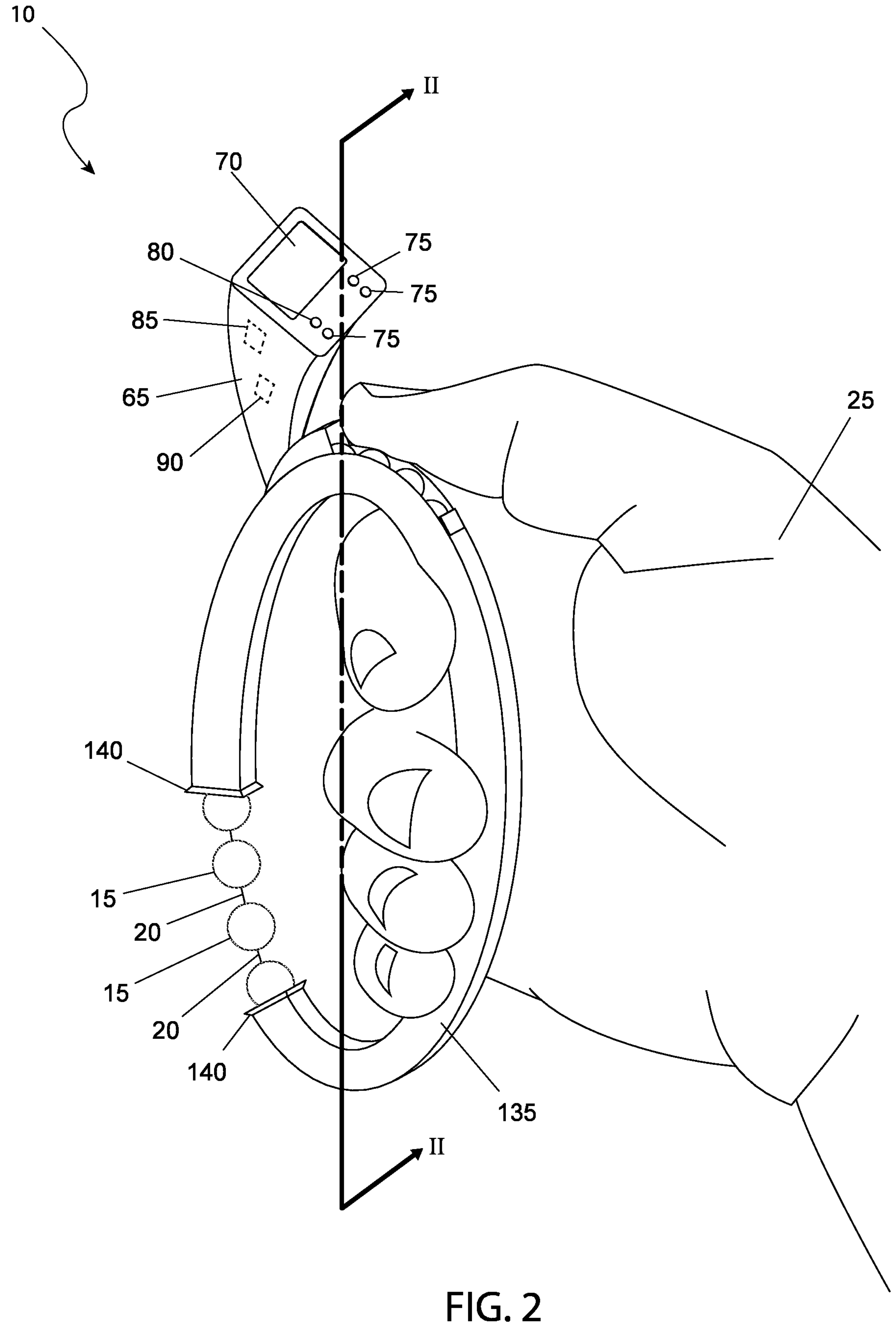
FIG. 2 is a perspective view of the digital prayer aid with counting feature, shown in a utilized state, according to a first alternate embodiment of the present invention.

Referring next to FIG. 2, a perspective view of the prayer aid 10, shown in a utilized state, according to a first alternate embodiment of the present invention is depicted. The first alternate embodiment is a simplified version of the preferred embodiment of FIG. 1. A three-quarter (¾) circle bead enclosure 135 with angular guides 140 is provided to allow for visual observation of the beads 15 and string 20. A display enclosure 65 with a main screen 70, mode control switches 75 and a reset switch 80 are provided in a visual manner. A beeper 85 and a vibratory mechanism 90 (both internal to the display enclosure 65 and thus displayed via hidden lines) are activated when certain increments of bead 15 movement is achieved. Such increments, pre-programmed, but adjustable via the mode control switches 75 are envisioned to be every twenty (20), thirty-three (33), fifty-two (52), sixty-six (66), one hundred (100) or one thousand (1000) events or movement of the beads 15.

Figure 3:
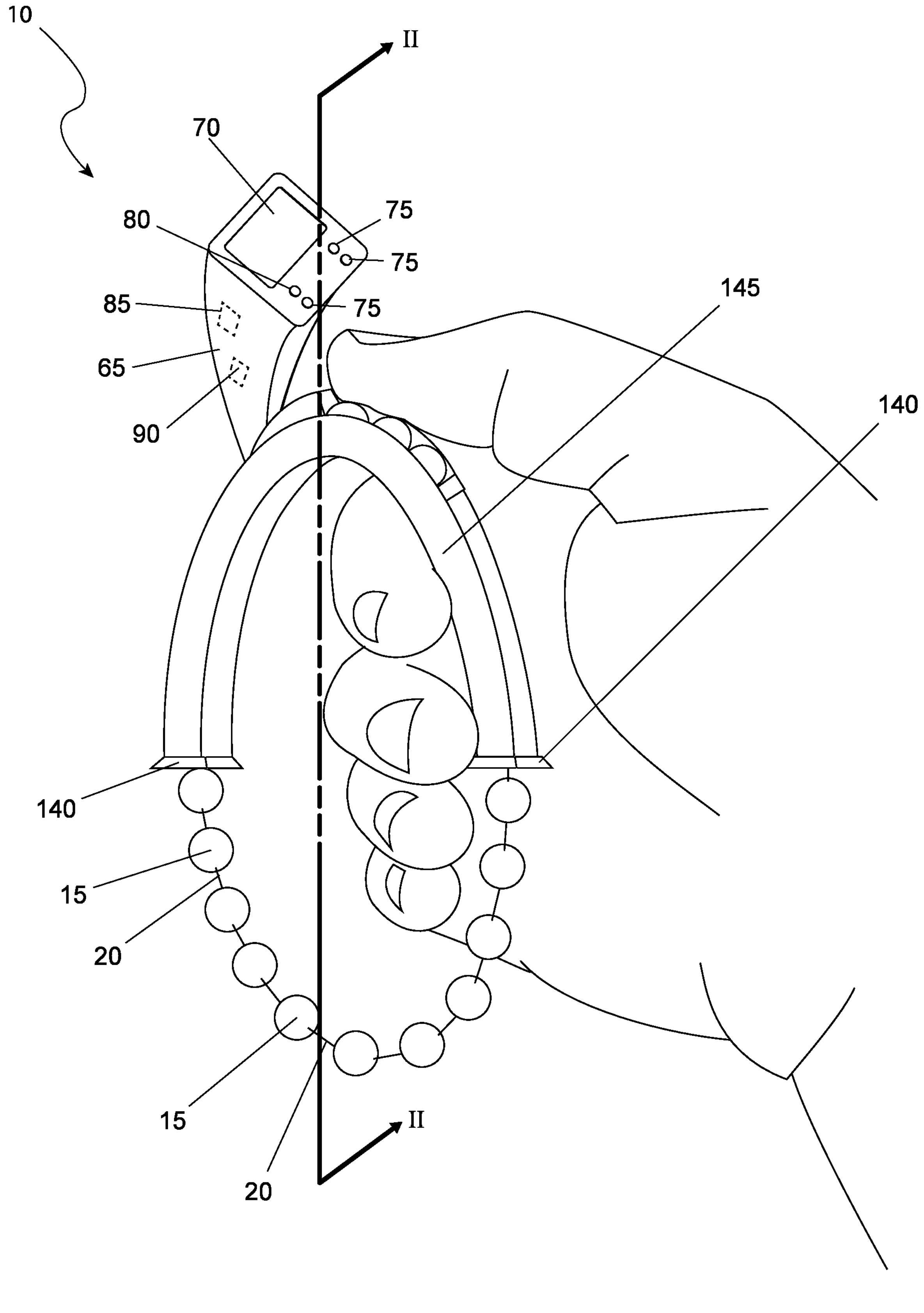
FIG. 3 is a perspective view of the digital prayer aid with counting feature, shown in a utilized state, according to a second alternate embodiment of the present invention.

Referring now to FIG. 3, a perspective view of the prayer aid 10, shown in a utilized state, according to a second alternate embodiment of the present invention is shown. the second alternate embodiment is a simplified version of the preferred embodiment of FIG. 1 and a modified version of the first alternate embodiment of FIG. 2. A one-half (½) circle bead enclosure 145 with angular guides 140 is provided to allow for visual observation of the beads 15 and string 20. A display enclosure 65 with a main screen 70, mode control switches 75 and a reset switch 80 are provided in a visual manner. A beeper 85 and a vibratory mechanism 90 (both internal to the display enclosure 65 and thus displayed via hidden lines) are activated when certain increments of bead 15 movement is achieved. Such increments, pre-programmed, but adjustable via the mode control switches 75 are envisioned to be every twenty (20), thirty-three (33), fifty-two (52), sixty-six (66), one hundred (100) or one thousand (1000) events or movement of the beads 15.

Figure 4:
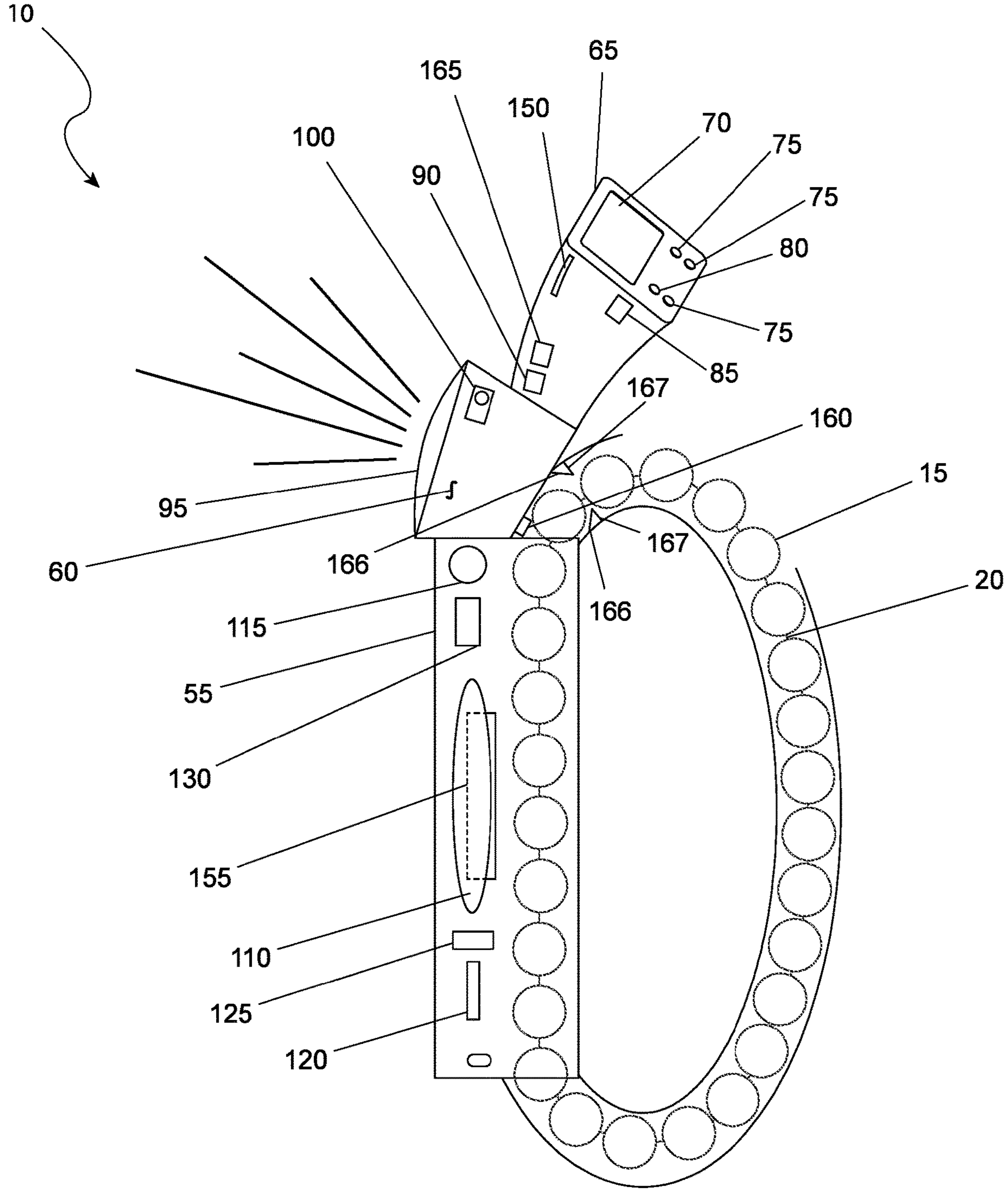
FIG. 4 is a sectional view of the digital prayer aid with counting feature, as seen along a Line I-I, as shown in FIG. 1, according to the preferred embodiment of the present invention.

Referring next to FIG. 4, a sectional view of the prayer aid 10, as seen along a Line I-I, as shown in FIG. 1, according to the preferred embodiment of the present invention is disclosed. The electrical components inside the display enclosure 65, such as the main screen 70, the mode control switches 75, the reset switch 80, the beeper 85, and the vibratory mechanism 90, are powered by a long-life small battery 150, envisioned to be similar to a coin-cell battery. The electronics in the electronics enclosure 55 and the light enclosure 60, such as the flashlight 95, the light switch 100, the side mount screen 110, the side mount speaker 115, the SD card reader 120, the Bluetooth® transmitter 125 and the digital audio player 130 are powered by a large rechargeable battery 155 which is recharged via the charging port 105. A bead contact switch 160 provides a signal to a main controller 165 whenever a bead 15 passes by it. The bead contact switch 160 may be optical, mechanical, capacitive or inductive. The exact type of bead contact switch 160 is not intended to be a limiting factor of the present invention. Backward motion of the beads 115 is prohibited by two (2) directional stops 166 each equipped with a spring 167.

Figure 5:
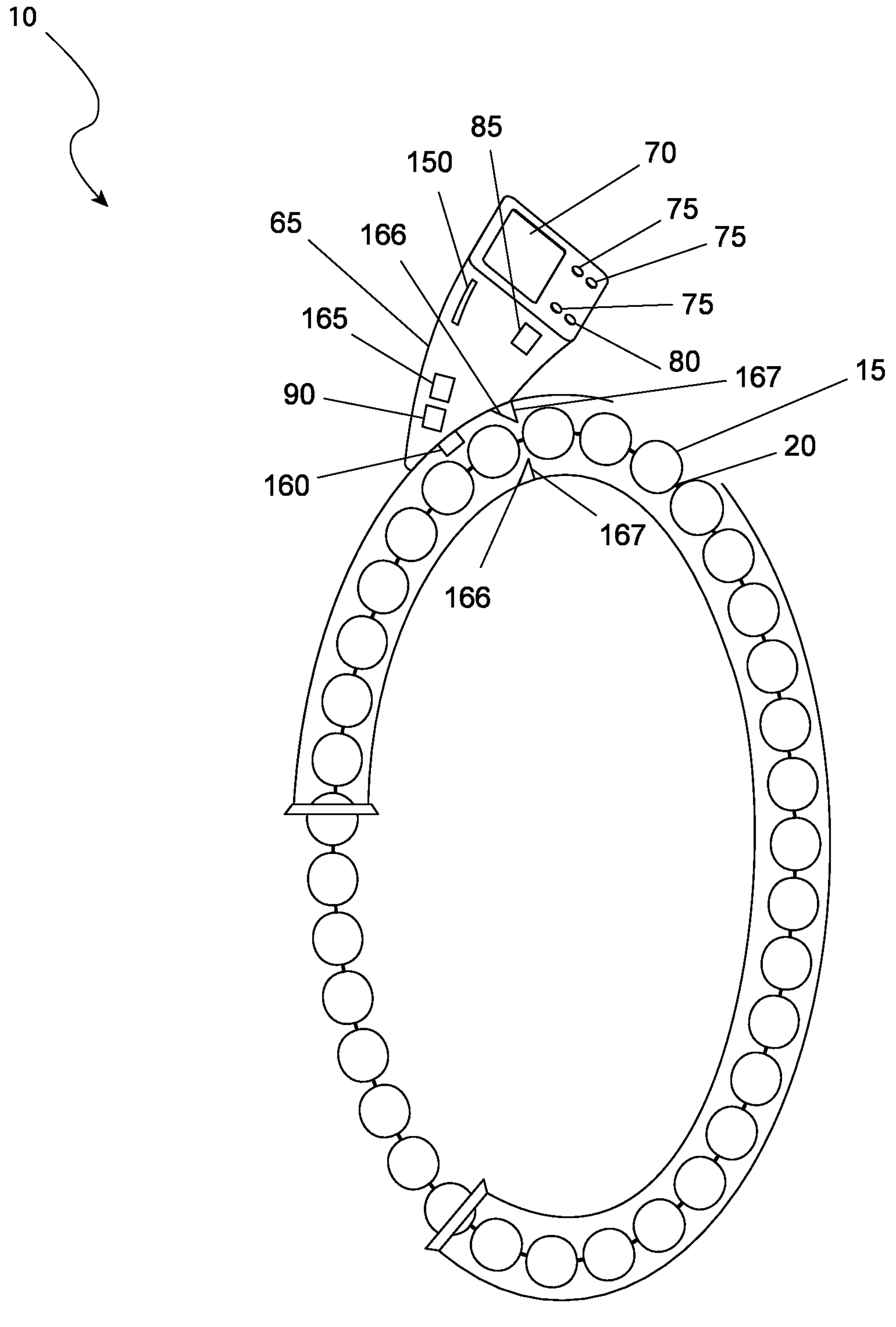
FIG. 5 is a sectional view of the digital prayer aid with counting feature, as seen along a Line II-II, as shown in FIG. 2, according to the first alternate embodiment of the present invention.

Referring now to FIG. 5, a sectional view of the prayer aid 10, as seen along a Line II-II, as shown in FIG. 2, according to the first alternate embodiment of the present invention is depicted. The electrical components inside the display enclosure 65, such as the main screen 70, the model control switches 75, the reset switch 80, the beeper 85, and the vibratory mechanism 90, are powered by a long-life small battery 150, envisioned to be similar to a coin-cell battery. A bead contact switch 160 provides a signal to a main controller 165 whenever a bead 15 passes by it. The bead contact switch 160 may be optical, mechanical, capacitive or inductive. The exact type of bead contact switch 160 is not intended to be a limiting factor of the present invention. As aforementioned described, backward motion of the beads 115 is prohibited by two (2) directional stops 166 each equipped with a spring 167.

Figure 6:
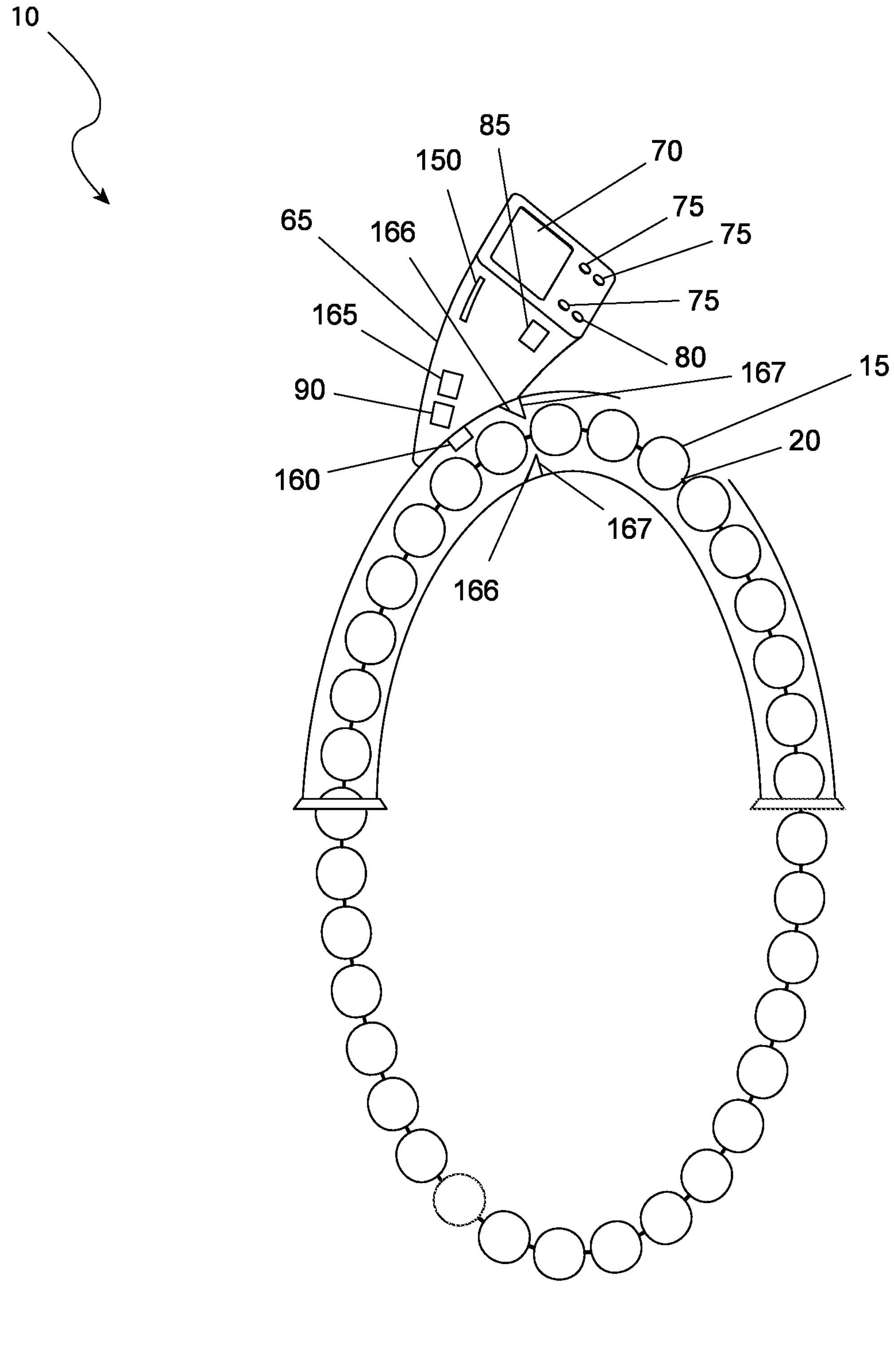
FIG. 6 is a sectional view of the digital prayer aid with counting feature, as seen along a Line III-III, as shown in FIG. 3, according to the first alternate embodiment of the present invention.

Referring next to FIG. 6, a sectional view of the prayer aid 10, as seen along a Line III-III, as shown in FIG. 3, according to the first alternate embodiment of the present invention is shown. The electrical components inside the display enclosure 65, such as the main screen 70, the mode control switches 75, the reset switch 80, the beeper 85, and the vibratory mechanism 90, are powered by a long-life small battery 150, envisioned to be similar to a coin-cell battery. A bead contact switch 160 provides a signal to a main controller 165 whenever a bead 15 passes by it. The bead contact switch 160 may be optical, mechanical, capacitive or inductive. The exact type of bead contact switch 160 is not intended to be a limiting factor of the present invention. As aforementioned described, backward motion of the beads 115 is prohibited by two (2) directional stops 166 each equipped with a spring 167.

Figure 7:
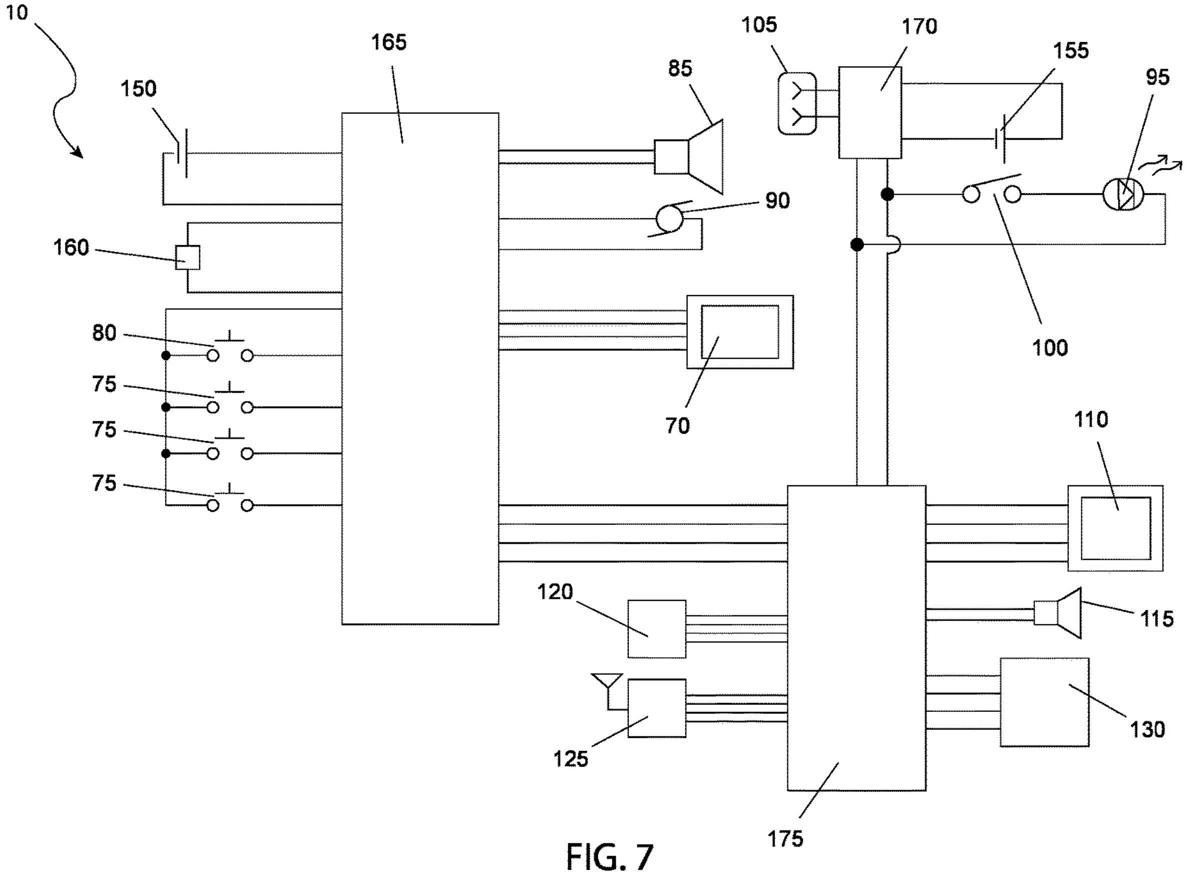
FIG. 7 is an electrical block diagram of the digital prayer aid with counting feature, according to the preferred embodiment of the present invention.

Referring now to FIG. 7, an electrical block diagram of the prayer aid 10, according to the preferred embodiment of the present invention is disclosed. The small battery 150 provides power to the main controller 165. The mode control switches 75, the reset switch 80, and the bead contact switch 160 provide inputs to the main controller 165 for use in internal programming and clock/alarm/counter/functionality. The main screen 70 the beeper 85 and the vibratory mechanism 90 then serve as outputs to direct the actions of the user. The main controller 165 is viewed as a single board computer (SBC) such as a basic stamp module, Arduino, or the like. The large rechargeable battery 155 is recharged via a charge controller 170 which receives input or charging power from the charging port 105. Output power from the charge controller 170 is then controlled via the light switch 100 to illuminate the flashlight 95. Power is also passed to an auxiliary controller 175 which controls the input functionality of the SD card reader 120 and the Bluetooth® transmitter 125 and the output functionality of the side mount screen 110, the side mount speaker 115 and the digital audio player 130. Separation of powered components between the small battery 150 and the large rechargeable battery 155 allow the principal functionality of the prayer aid 10; counting of beads 15 (as shown in FIGS. 1, 2, and 3) to be performed even if the large rechargeable battery 155 is completely discharged.

Figure 8:
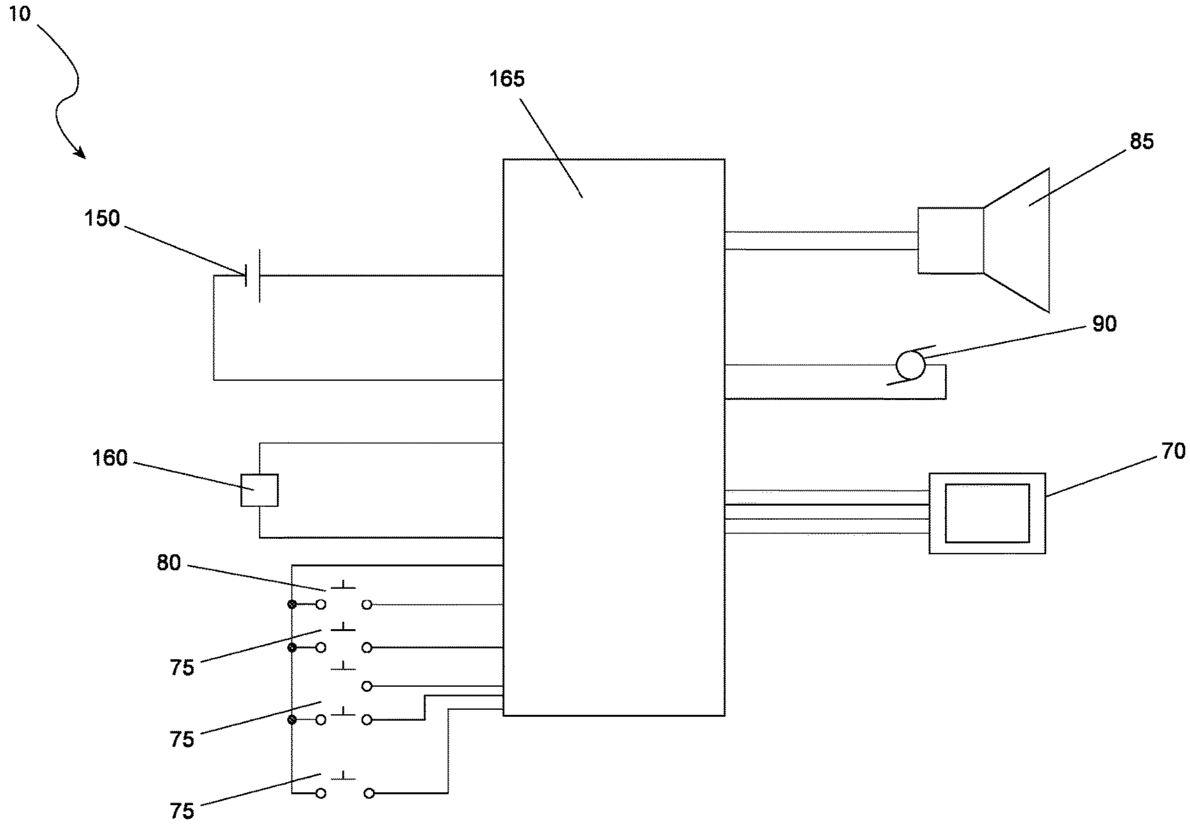
FIG. 8 is an electrical block diagram of the digital prayer aid with counting feature, according to the first and second alternate embodiment of the present invention.

Referring to FIG. 8, an electrical block diagram of the prayer aid 10, according to the first and second alternate embodiment of the present invention is depicted. The small battery 150 provides power to the main controller 165. The mode control switches 75, the reset switch 80, and the bead contact switch 160 provide inputs to the main controller 165 for use in internal programming and clock/alarm/counter/functionality. The main screen 70 the beeper 85 and the vibratory mechanism 90 then serve as outputs to direct the actions of the user. The main controller 165 is viewed as a single board computer (SBC) such as a basic stamp module, Arduino, or the like.

2. Operation of the Preferred Embodiment

The preferred embodiment of the present invention can be utilized by the common user in a simple and effortless manner with little or no training. It is envisioned that the prayer aid 10 would be constructed in general accordance with FIG. 1 through FIG. 8. The user would procure the prayer aid 10 from conventional procurement channels such as religious supply houses, department stores, mail order and internet supply houses and the like. Special attention would be paid to the overall configuration of the prayer aid 10 with regards to the preferred embodiment of FIG. 1 or the alternate embodiments of FIG. 2 or 3.

After procurement and prior to utilization, the digital prayer aid with counting feature 10 would be prepared in the following manner: the small battery 150 would be installed in the display enclosure 65; if required, the large rechargeable battery 155 would be installed in the electronics enclosure 55 and charged through the charging port 105; if required an SD card containing prayer data would be inserted into the SD card reader 120 or the Bluetooth® transmitter 125 would be paired with a computer or smart phone for the transfer of prayer data. At this point in time, the prayer aid 10 is ready for utilization.

During utilization of the prayer aid 10, the following procedure would be initiated: the user would grasp the prayer aid 10 in either the preferred or alternate embodiments in the right hand 25 with the full bead enclosure 50, the three-quarter (¾) circle bead enclosure 135 or the one-half (½) circle bead enclosure 145 resting on their index finger 30. Using prayer information provided by the side mount screen 110, or the side mount speaker 115 in the instance of the preferred embodiment, or via memory in the case of the alternate embodiments, the user would begin reciting prayers. At the completion of each prayer or imploration, the user would pull down or advance one (1) bead 15 with their thumb 40; said bead 15 movement is then detected by the bead contact switch 160 and registered on the main screen 70. Each subsequent advancement is detected and accumulated into a total count. Once a predetermined total has been reached, the beeper 85 or the vibratory mechanism 90 will activate indicating completion of a cycle. The user may cease use of the prayer aid 10 at this time or active the reset pushbutton 80 to allow for continued use.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A digital prayer aid, comprising:
- a series of beads interconnected with a string;
- a full bead enclosure housing the series of beads and the string;
- an electronics enclosure having a side mount screen, an LCD-style screen, a side mount speaker, an SD card reader, and a Bluetooth transmitter to allow for visual text based and audible playback of a plurality of prayers;
- a light enclosure having a flashlight disposed on the light enclosure that is controlled by a light switch;
- a display enclosure housing a main screen, a liquid crystal display screen, a plurality of multiple mode control switches, and a reset switch;
- a beeper and a vibratory mechanism activated when a plurality of predetermined increments of beads movements are activated by a plurality of mode control switches;
- a charging port disposed on a side of the electronics enclosure; and
- a circle bead enclosure having a plurality of angular guides that allow for visual observation of the series of beads and the string.

2. The digital prayer aid, according to claim 1, wherein the series of beads include 23 beads.

3. The digital prayer aid, according to claim 1, wherein the series of beads include 33 beads.

4. The digital prayer aid, according to claim 1, wherein the series of beads are made of a material selected from the group consisting of wood, glass, plastic, polymer, metal, or stone.

5. The digital prayer aid, according to claim 1, wherein the string is made of a material selected from the group consisting of silk, nylon, monofilament, leather cord, or waxed linen cord.

6. The digital prayer aid, according to claim 1, wherein a tassel is disposed on the full bead enclosure.

7. The digital prayer aid, according to claim 1, wherein the flashlight, the light switch, the side mount screen, the side mount speaker, the SD card reader, the Bluetooth transmitter and the digital audio player are powered by a rechargeable battery.

8. The digital prayer aid, according to claim 1, wherein the flashlight is a light-emitting diode.

9. The digital prayer aid, according to claim 1, wherein the main screen includes a digital clock having a time zone adjustment, a day and date function, an illuminated screen, a stopwatch, an alarm functions, or an odometer.

10. The digital prayer aid, according to claim 1, wherein the main screen is water resistance.

11. The digital prayer aid, according to claim 1, wherein the prayers are added via an SD card loaded on a computer or via the Bluetooth transmitter via pairing with a smart phone or tablet computer.

12. The digital prayer aid, according to claim 1, wherein the electronics enclosure, the light enclosure, and the display enclosure are made of plastic.

13. The digital prayer aid, according to claim 1, wherein the predetermined increments include a number of events or bead movements selected from the group consisting of twenty events or bead movements, thirty-three events or bead movements, fifty-two events or bead movements, sixty-six events or bead movements, one hundred events or bead movements or one thousand events or bead movements.

14. The digital prayer aid, according to claim 1, wherein the main screen, the mode control switches, the reset switch, the beeper, and the vibratory mechanism are powered by a battery.

15. The digital prayer aid, according to claim 14, wherein the battery is a coin-cell battery.

16. The digital prayer aid, according to claim 1, wherein the circle bead enclosure is three-quarters of a circle bead.

17. The digital prayer aid, according to claim 16, wherein the circle bead enclosure is one half of a circle bead.

18. The digital prayer aid, according to claim 1, wherein a bead contact switch includes a signal to a main controller whenever a bead passes by it.

19. The digital prayer aid, according to claim 1, wherein the main controller is a single board computer that includes a basic stamp module or Arduino.

20. The digital prayer aid, according to claim 1, wherein the digital prayer aid is adapted to rest upon an index finger, encompassing a plurality of fingers while a thumb is used to pull one of the series of beads for each phrase or incantation from one of the prayers.

* * * * *